(12) United States Patent
Sockwell

(10) Patent No.: US 11,371,195 B2
(45) Date of Patent: Jun. 28, 2022

(54) INDIRECT HEATED HEATING/DRYING/MIXING DRUM FOR PROCESSING RECYCLED ASPHALT PRODUCTS AND METHOD THEREFOR

(71) Applicant: PHOENIX INDUSTRIES, LLC, Prescott Valley, AZ (US)

(72) Inventor: Kelly R. Sockwell, Prescott Valley, AZ (US)

(73) Assignee: PHOENIX INDUSTRIES, LLC, Prescott Valley, AZ (US)

(*) Notice: Subject to any disclaimer, the term of this patent is extended or adjusted under 35 U.S.C. 154(b) by 435 days.

(21) Appl. No.: 16/726,568

(22) Filed: Dec. 24, 2019

(65) Prior Publication Data
US 2021/0189664 A1 Jun. 24, 2021

(51) Int. Cl.
*E01C 19/08* (2006.01)
*B65G 33/30* (2006.01)
*B65G 33/14* (2006.01)
*B01F 35/90* (2022.01)
*E01C 19/10* (2006.01)

(52) U.S. Cl.
CPC .............. *E01C 19/08* (2013.01); *B01F 35/90* (2022.01); *B65G 33/14* (2013.01); *B65G 33/30* (2013.01); *E01C 19/1004* (2013.01); *E01C 19/1045* (2013.01); *B01F 2035/99* (2022.01); *E01C 2019/109* (2013.01)

(58) Field of Classification Search
CPC .. E01C 19/08; E01C 19/1004; E01C 19/1045; E01C 2019/109; E01C 19/1013; E01C 19/1027; E01C 19/104; E01C 19/05; E01C 19/1036; B01F 35/90; B01F 2035/99; B65G 33/14; B65G 33/30
See application file for complete search history.

(56) References Cited

U.S. PATENT DOCUMENTS

| 4,427,376 | A | † | 1/1984 | Etnyre | |
| 4,850,861 | A | * | 7/1989 | Poroshin | F26B 23/02 |
| | | | | | 432/112 |
| 5,083,870 | A | * | 1/1992 | Sindelar | E01C 19/1036 |
| | | | | | 432/110 |
| 7,993,048 | B1 | † | 8/2011 | Collette | |
| 9,566,557 | B2 | † | 2/2017 | Huh | |

(Continued)

*Primary Examiner* — Abigail A Risic
(74) *Attorney, Agent, or Firm* — Weiss & Moy, P.C.; Jeffrey D. Moy

(57) ABSTRACT

An indirect heating, drying and mixing chamber has a drum. A mixing/conveyor mechanism is positioned within the drum mixing and moving materials through the drum. An enclosure is provided wherein the drum is inserted within the enclosure to form an upper section of the enclosure between the drum and a top surface of the enclosure and a lower section of the enclosure between the drum and a bottom surface of the enclosure. A plurality of heat openings is formed on the bottom surface of the enclosure. A plurality of heating elements is provided, wherein an individual heating element is coupled to a corresponding heat opening, the plurality of heating elements generating heat which travels along the lower section of the enclosure and through the upper section of the enclosure heating the material in the drum.

20 Claims, 2 Drawing Sheets

(56) References Cited

U.S. PATENT DOCUMENTS

2015/0338162 A1* 11/2015 Hoffman ................ C10G 33/00
                                                              34/236
2016/0199799 A1*  7/2016 Huh ........................ B01F 27/72
                                                              366/24
2021/0331871 A1* 10/2021 Bradford ................ B65G 33/14

* cited by examiner
† cited by third party

INDIRECT HEATED HEATING/DRYING/MIXING DRUM FOR PROCESSING RECYCLED ASPHALT PRODUCTS AND METHOD THEREFOR

TECHNICAL FIELD

The present application generally relates to a device for mixing asphalt and, more particularly, to a device which uses indirect heating along two heating paths to heat, dry and mix the recycled asphalt product material within the heating/drying/mixing drum.

BACKGROUND

Recycled asphalt products (RAP) is simply old asphalt that has been ground into gravel and binds together once it is reheated and compacted, hardening again. Asphalt is not very "environmentally friendly". Thus, asphalt is typically recycled and reused. As early as 1993, the Environmental Protection Agency and Federal Highway Administration identified asphalt pavement as the number 1 recycled product in the United States. Asphalt is generally reclaimed and reused at a greater rate than any other product in the United States. According to the National Asphalt Pavement Association (NAPA), approximately 73 million tons of RAP material is reused every year. This is almost twice as much as the combined total of 40 million tons of recycled paper, glass, aluminum and plastics. The use of recycled materials in asphalt pavements saves more than 60 million cubic yards of landfill space each year.

Virgin Aggregate Material (VAM) is generally placed in a drum mixer asphalt plant. Typically, moisture-laden VAMs are dried and heated within a rotating, open-ended drum mixer through radiant, convective and conductive heat transfer from a stream of hot gases produced by a burner flame. As the heated VAM flows through the drum mixer, it is combined with liquid asphalt and mineral binder to produce an asphaltic composition as the desired end-product. However, often, prior to mixing the virgin aggregate and liquid asphalt, previously crushed RAP is added. The RAP is typically mixed with the heated VAM in the drum mixer at a point prior to adding the liquid asphalt and mineral fines.

The use of RAP has many environmental challenges. The drum mixer generates a gaseous hydrocarbon emission (known as blue smoke) and sticky dust particles covered with asphalt. Some asphalt plants exposed the liquid asphalt or RAP material to excessive temperatures within the drum mixer or put the materials in close proximity with the burner flame which caused serious product degradation and blue smoke. Further, in these drum mixer designs, the asphalt ingredients in the drum mixer flowed in the same direction (i.e., co-current flow) as the hot gases for heating and drying the aggregate. Thus, the asphalt component of recycle material and liquid asphalt itself came in direct contact with the hot gas stream and, in some instances, even the burner flame itself.

Therefore, it would be desirable to provide a system and method that overcome the above problems.

SUMMARY

In accordance with one embodiment, an indirect heating, drying and mixing chamber is disclosed. The heating, drying and mixing chamber has a drum. A mixing/conveyor mechanism is positioned within the drum mixing and moving materials through the drum. An enclosure is provided wherein the drum is inserted within the enclosure to form an upper section of the enclosure between the drum and a top surface of the enclosure and a lower section of the enclosure between the drum and a bottom surface of the enclosure. A plurality of heat openings is formed on the bottom surface of the enclosure. A plurality of heating elements is provided wherein an individual heating element is coupled to a corresponding heat opening, the plurality of heating elements generating heat which travels along the lower section of the enclosure and through the upper section of the enclosure heating the material in the drum.

In accordance with one embodiment, an indirect heating, drying and mixing chamber is disclosed. The heating, drying and mixing chamber has a drum. A feeder opening is formed on a first end of the drum. A discharge opening is formed on a second end of the drum opposite of the first end. A mixing/conveyor mechanism is positioned within the drum mixing and moving materials entering the drum through the feeder opening through the drum and out the discharge opening. An enclosure is provided wherein the drum is inserted within the enclosure to form an upper section of the enclosure between the drum and a top surface of the enclosure and a lower section of the enclosure between the drum and a bottom surface of the enclosure, a first end of the drum and the second end of the drum extending out of the enclosure. A plurality of heat openings is formed on the bottom surface of the enclosure. A plurality of heating elements is coupled to the bottom surface of the enclosure, the plurality of heating elements generating heat which travels along the lower section of the enclosure and through the upper section heating the material in the drum.

In accordance with one embodiment, an indirect heating, drying and mixing chamber is disclosed. The heating, drying and mixing chamber has a drum. A feeder opening is formed on a first end of the drum. A feeder tube extends up from the feeder opening. A discharge opening is formed on a second end of the drum opposite of the first end. A discharge tube extends down from the discharge opening. A mixing/conveyor mechanism is positioned within the drum mixing and moving materials entering the drum through the feeder opening through the drum and out the discharge opening. An enclosure is provided wherein the drum is inserted within the enclosure to form an upper section of the enclosure between the drum and a top surface of the enclosure and a lower section of the enclosure between the drum and a bottom surface of the enclosure, a first end of the drum and the second end of the drum extends out of the enclosure. A divider runs horizontally within the enclosure. The divider forms a "U" shaped channel in the enclosure wherein a first leg of the "U" shaped channel forms the lower section of the enclosure and a second leg of the "U" shaped channel forms the upper section of the enclosure. A plurality of burner openings is formed on the bottom surface of the enclosure. A plurality of burners is coupled to the bottom surface of the enclosure, the plurality of burners generating heat which travels along the lower section of the enclosure and through the upper section of the enclosure heating the material in the drum. A vent opening is formed in the top surface of the enclosure allowing the heat to exit the enclosure after traveling along the lower section of the enclosure and through the upper section of the enclosure.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the heating/drying/mixing chamber (hereinafter chamber) has a mixing drum which passes through a heat-insulating enclosure. The heat insulated enclosure is heated by several burners. This heat chamber is divided horizontally along the center line of the mixing drum positioned therein, thus directing the heated burner gases to make two full passes along the length of the drum before exiting the heat-insulating enclosure.

Figure 1:
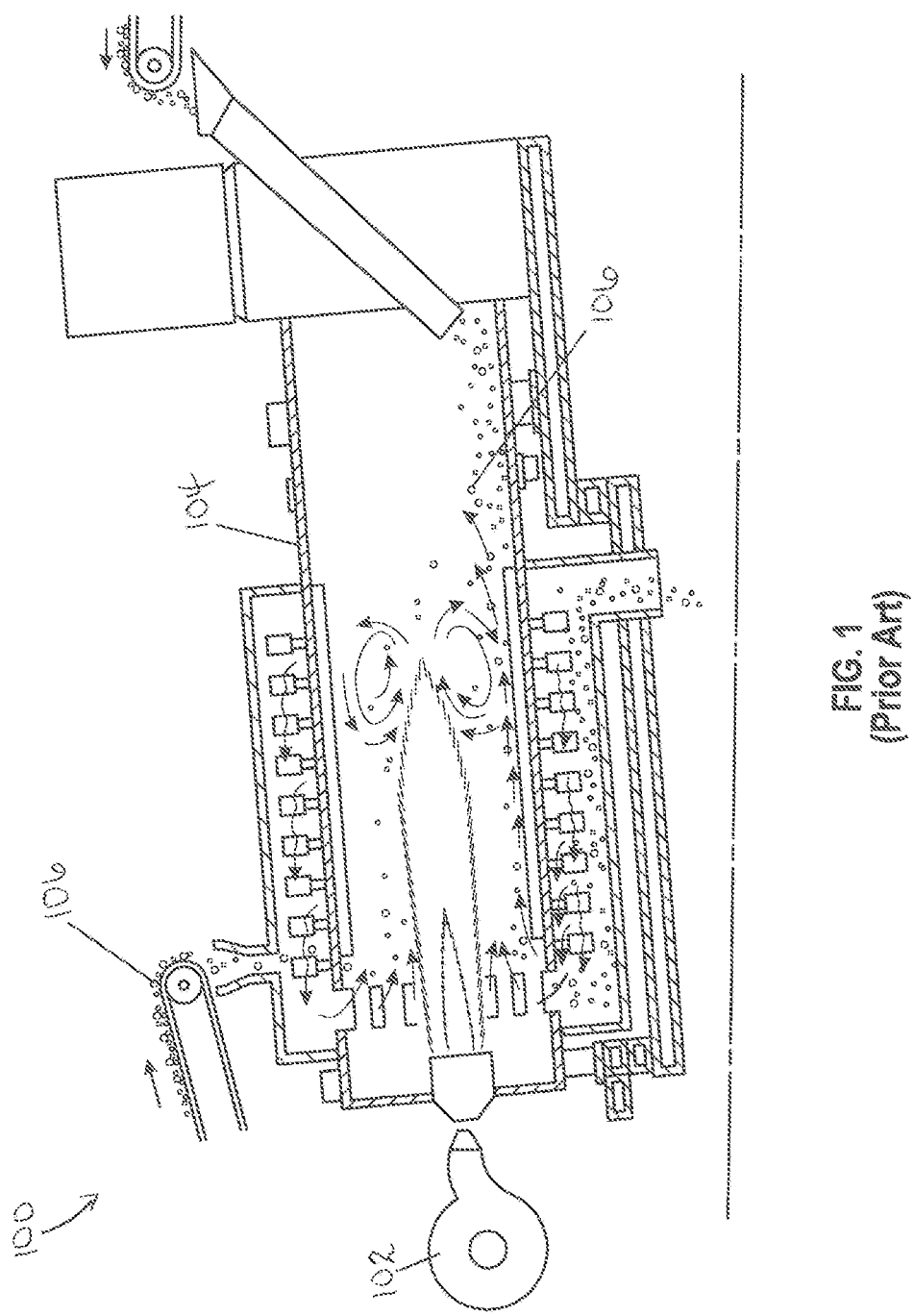
FIG. 1 is a cross-sectional side view of a prior art counter-flow asphalt plant.

Referring to FIG. 1, shows a direct-heat drum dryer 100 that is known in the prior art may be seen. As shown, a burner 102 directs a flame axially into the interior of an inclined rotating drum 104. Raw materials or other materials 106 (i.e. materials in need of drying and/or heating) such as, but not limited to, recycled asphalt products are then fed into the rotating drum dryer 100, where they are dried by heat from the burner's 102 flame as they are conveyed downwardly through the rotating drum 104. As the drum 104 rotates, the materials 106 come into direct contact with the burner's 102 flame because, as the drum 104 rotates, the materials 106 rotate within the drum 104 and eventually fall through the burner's 102 flame.

Figure 2:
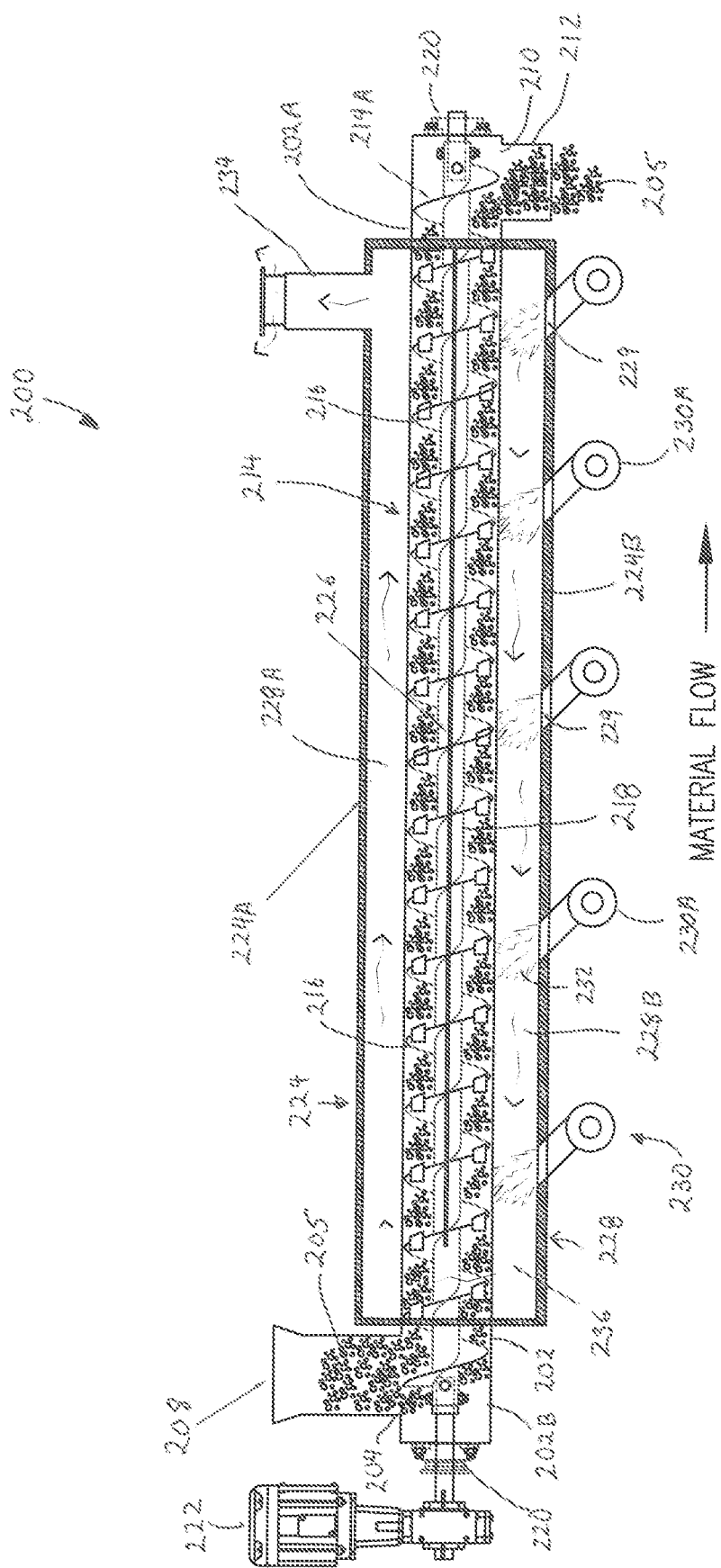
FIG. 2 is a perspective view of the presence monitoring device of FIG. 1 position above a door according to one aspect of the present application.

Referring to FIG. 2, an indirect heating/drying/mixing chamber (hereinafter chamber) 200 may be seen. The chamber 200 uses indirect heat application in order to dry and/or heat materials therein. The chamber 200 may have a drum 202. In accordance with one embodiment, the drum 202 may be cylindrical in shape. However, this is just one embodiment, and other geometrical configurations may be used. A feeder opening 204 may be formed on one end of the drum 202. The feeder opening 204 may be used to insert raw materials or other materials 205 (i.e. materials in need of drying and/or heating) such as, but not limited to, recycled asphalt products into the drum 202. In accordance with one embodiment, the feeder opening 204 may be located on a top area 202A of the drum 202. A feeder tube 208 may extend up from the feeder opening 204. The feeder tube 208 may be used to store materials 205 so that the drum 202 may be continuously feed with the materials 205.

A discharge opening 210 may be formed on an opposing end of the drum 202 from the feeder opening 204. The discharge opening 210 may be used to discharge the materials 205 that have been processed by the chamber 200. In accordance with one embodiment, the discharge opening 210 may be formed on a bottom surface 202B of the drum 202. A discharge chute 212 may extend down from the discharge opening 210.

A mixing/conveyor mechanism 214 may be positioned within the drum 202. The mixing conveyor mechanism 214 may be used to move and mix the material 205 through the drum 202. In accordance with one embodiment, the mixing conveyor mechanism 214 may be a screw conveyor 214A. The screw conveyor 214A may have a rotating helical screw blade 216. The screw blades 216 may have a circumference similar in size to that of the drum 202. Thus, the top and bottom ends of each screw blade 216 may be adjacent to the top 202A and bottom 202B surfaces respectively of the drum 202. The screw blades 216 coil around a shaft 218. The shaft 218 may be axially aligned and run down a centerline of the drum 202. Thrust bearing plates 220 may be positioned on opposing ends of the drum and axially aligned with the centerline. Each end of the shaft 218 may be attached to a respective thrust bearing plate 220. The thrust bearing plates 220 hold the screw conveyor 214A within the drum 202 while allow the screw conveyor 214A to rotate.

A drive device 222 may be attached to one end of the shaft 218. The drive device 222 may be used to rotate the shaft 218 and hence the screw conveyor 214A. In accordance with one embodiment, one end of the shaft 218 extends out from the respective thrust bearing plate 220 and is attached to the drive device 222. In the present embodiment, the drive device 222 may be attached to the end of the shaft 218 closest to the feeder opening 204.

The chamber 200 may have an enclosure 224. The enclosure may be a heat-insulated enclosure 224A. The chamber 200 may be designed so that the drum 202 may be inserted within the enclosure 224. In accordance with the present embodiment, the drum 202 may be inserted within the enclosure 224 such that the feeder opening 204 may extend out of one end of the enclosure 224 and the discharge opening 210 extending out of an opposing end of the enclosure 224 from the feeder opening 204.

The enclosure 224 may have a chamber divider 226. The chamber divider 226 may be used to divide the enclosure 224 into two sections. In the present embodiment, the chamber divider 226 divides the enclosure 224 into an upper section 224A and a lower section 224. The upper section 224A and the lower section 224B may be approximately equal in size.

The chamber divider 226 may run horizontally from one end of the enclosure 224 down towards an opposing end of the enclosure 224 but stopping prior to reaching the opposing end. The chamber divider 226 may run down a center along a length of the enclosure 224. In the present embodiment, the chamber divider 226 may form a "U" shape channel 228 through the enclosure 224. One leg 228A of "U" shape channel 228 may upper section 224A, while another leg 228B may form the lower section 224B. A bottom of the "U" shaped channel 228 may be towards the end of the enclosure 224 where the feeder opening 204 may be located.

In accordance with one embodiment, the shaft 218 may have a channel 218 that runs down a length thereof. The channel 218 may allow the shaft 218 to be inserted upon the chamber divider 226 allowing the shaft 218 to rotate upon the chamber divider 226.

A plurality of openings 229 may be formed in the enclosure 224. The openings 229 may be used to inject a heat source 230 into the enclosure 224. In the present embodiment, the openings 229 may be formed in a bottom section of the enclosure 224. The openings 229 may be formed such that a center of each opening 229 may be equal distance to an adjacent opening 229. Each opening 229 may be angled so as to direct the heat source 230 towards the bottom of the "U" shape channel 228.

A heat source 230 may be located at each opening 229. The heat source 230 may be a burner 230A. Each burner 230A may emit a flame 232 into the enclosure 224. The burner 230A may emit and direct the flame 232 at an angled so that the flame 232 may be direct towards the bottom of the "U" shape channel 228. The flames 232 generate a heated gas 236 which travels through the "U" shape channel 228.

A vent opening 234 may be formed in the enclosure 224. The vent opening 234 may be used to provide a pathway to vent any smoke as well as provide a mechanism for the heated gases 236 to be released from the enclosure 224. In the present embodiment, the vent opening 234 may be formed in a top area of the enclosure 224. The vent opening 234 may be located in a top area of the enclosure 234 towards the end of the enclosure 224 where the discharge opening 210 may be located.

In operation, the feeder tube 208 may be loaded with material 205 to feed the material 205 into the drum 206 via the feeder opening 204. The feeder tube 208 may be kept full, i.e. flooded, during processing of the material 205 so that the material 205 is heated, dried and mixed in an environment free of excess oxygen.

The drive device 222 rotates the screw conveyor 214A within the drum 202 causing the helical screw blade 216 to rotate thereby moving the material 206 through the drum 206.

The drum 206 runs horizontally along the enclosure 224. Each burner 230A may emit a flame 232 into the enclosure 224. The enclosure 224 may be divided horizontally along the center line of the drum 202 forming a "U" shape channel 228 through the enclosure 224. A bottom of the "U" shaped channel 228 may be towards the end of the enclosure 224 where the feeder opening 204 may be located.

The heated gas 236 from the burners 230A flows along the "U" shape channel 228 thereby making two full passes along the length of the drum 206 before exiting the enclosure 224 via the vent opening 234. Heating of the material 205 may be accomplished by heat transferred from the outer surface to the inter surface of the drum 206 which is contacted by the material 205 as it is conveyed inside along the length of the drum 206.

The screw conveyor 214A may move the material 205 through the drum 206 and provides a lift and fold action to promote heat transfer and homogeneously heating, drying and mixing the material 205. The temperature of the material 205 may be controlled by varying the rotational speed of the screw conveyor 214A and/or raising or lowering the firing rate of the burners 230A.

The production rate of the chamber 200 can be varied by increasing or decreasing the diameter and/or length of the drum 206 as well as increasing or decreasing the number and size of the burners 230A. Additionally, mutable drums 206 may be used together either in parallel or series for higher production.

The foregoing description is illustrative of particular embodiments of the application, but is not meant to be a limitation upon the practice thereof. The following claims, including all equivalents thereof, are intended to define the scope of the application.

What is claimed is:

1. An indirect heating, drying and mixing chamber comprising:
    a drum;
    a mixing/conveyor mechanism positioned within the drum mixing and moving materials through the drum;
    an enclosure, the drum inserted within the enclosure to form an upper section of the enclosure between the drum and a top surface of the enclosure and a lower section of the enclosure between the drum and a bottom surface of the enclosure;
    a plurality of heat openings formed on the bottom surface of the enclosure; and
    a plurality of heating elements, wherein an individual heating element is coupled to a corresponding heat opening, the plurality of heating elements generating heat which travels along the lower section of the enclosure and through the upper section of the enclosure heating the material in the drum.

2. The indirect heating, drying and mixing chamber of claim 1, comprising a divider running horizontally within the enclosure forming the upper section of the enclosure and the lower section of the enclosure.

3. The indirect heating, drying and mixing chamber of claim 2, wherein the divider forms a "U" shaped channel in the enclosure, a first leg of the "U" shaped channel forming the lower section of the enclosure and a second leg of the "U" shaped channel forming the upper section of the enclosure.

4. The indirect heating, drying and mixing chamber of claim 1, comprising a feeder opening on a first end of the drum.

5. The indirect heating, drying and mixing chamber of claim 1, comprising:
    a feeder opening on a top surface of a first end of the drum; and
    a feeder tube extending up from the feeder opening.

6. The indirect heating, drying and mixing chamber of claim 4, comprising a discharge opening form on a second end of the drum opposite of the first end.

7. The indirect heating, drying and mixing chamber of claim 5, comprising:
    a discharge opening on a bottom surface of a second end of the drum opposite of the first end; and
    a discharge tube extending down from the discharge opening.

8. The indirect heating, drying and mixing chamber of claim 1, wherein the mixing/conveyor mechanism is a screw conveyor.

9. The indirect heating, drying and mixing chamber of claim 1, wherein the mixing/conveyor mechanism is a screw conveyor comprising:
    a shaft axially running horizontally down a centerline of the drum;
    a plurality of helical screw blades on the shaft.

10. The indirect heating, drying and mixing chamber of claim 9, comprising a drive device rotating the shaft.

11. The indirect heating, drying and mixing chamber of claim 1, comprising a vent opening formed in the top surface of the enclosure.

12. An indirect heating, drying and mixing chamber comprising:
    a drum;
    a feeder opening formed on a first end of the drum;
    a discharge opening formed on a second end of the drum opposite of the first end;
    a mixing/conveyor mechanism positioned within the drum mixing and moving materials entering the drum through the feeder opening through the drum and out the discharge opening;

an enclosure, the drum inserted within the enclosure to form an upper section of the enclosure between the drum and a top surface of the enclosure and a lower section of the enclosure between the drum and a bottom surface of the enclosure, a first end of the drum and the second end of the drum extending out of the enclosure;

a plurality of heat openings formed on the bottom surface of the enclosure; and a plurality of heating elements coupled to the bottom surface of the enclosure, the plurality of heating elements generating heat which travels along the lower section of the enclosure and through the upper section heating the material in the drum.

13. The indirect heating, drying and mixing chamber of claim 12, comprising a divider running horizontally within the enclosure forming the upper section of the enclosure and the lower section of the enclosure.

14. The indirect heating, drying and mixing chamber of claim 13, wherein the divider forms a "U" shaped channel in the enclosure, a first leg of the "U" shaped channel forming the lower section of the enclosure and a second leg of the "U" shaped channel forming the upper section of the enclosure.

15. The indirect heating, drying and mixing chamber of claim 12, comprising a feeder tube extending up from the feeder opening.

16. The indirect heating, drying and mixing chamber of claim 12, comprising a discharge tube extending down from the discharge opening.

17. The indirect heating, drying and mixing chamber of claim 12, wherein the mixing/conveyor mechanism is a screw conveyor comprising:
   a shaft axially running horizontally down a centerline of the drum;
   a plurality of helical screw blades on the shaft.

18. The indirect heating, drying and mixing chamber of claim 12, comprising a vent opening formed in the top surface of the enclosure.

19. An indirect heating, drying and mixing chamber comprising:
   a drum;
   a feeder opening formed on a first end of the drum;
   a feeder tube extending up from the feeder opening;
   a discharge opening formed on a second end of the drum opposite of the first end;
   a discharge tube extending down from the discharge opening;
   a mixing/conveyor mechanism positioned within the drum mixing and moving materials entering the drum through the feeder opening through the drum and out the discharge opening;
   an enclosure, the drum inserted within the enclosure to form an upper section of the enclosure between the drum and a top surface of the enclosure and a lower section of the enclosure between the drum and a bottom surface of the enclosure, a first end of the drum and the second end of the drum extending out of the enclosure;
   a divider running horizontally within the enclosure, the divider forming a "U" shaped channel in the enclosure, a first leg of the "U" shaped channel forming the lower section of the enclosure and a second leg of the "U" shaped channel forming the upper section of the enclosure;
   a plurality of burner openings formed on the bottom surface of the enclosure;
   a plurality of burners coupled to the bottom surface of the enclosure, the plurality of burners generating heat which travels along the lower section of the enclosure and through the upper section of the enclosure heating the material in the drum; and
   a vent opening formed in the top surface of the enclosure allowing the heat to exit the enclosure after traveling along the lower section of the enclosure and through the upper section of the enclosure.

20. The indirect heating, drying and mixing chamber of claim 19, wherein the mixing/conveyor mechanism is a screw conveyor comprising:
   a shaft axially running horizontally down a centerline of the drum;
   a plurality of helical screw blades on the shaft.

* * * * *